United States Patent
Ueda et al.

(10) Patent No.: US 8,505,669 B2
(45) Date of Patent: Aug. 13, 2013

(54) DRIVING FORCE DISTRIBUTION DEVICE

(75) Inventors: Masahide Ueda, Wako (JP); Jiro Hara, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 535 days.

(21) Appl. No.: 12/731,696

(22) Filed: Mar. 25, 2010

(65) Prior Publication Data
US 2010/0252348 A1 Oct. 7, 2010

(30) Foreign Application Priority Data
Apr. 2, 2009 (JP) ................................. 2009-090530

(51) Int. Cl.
*B60K 17/354* (2006.01)

(52) U.S. Cl.
USPC .............................. 180/245; 180/233; 701/69

(58) Field of Classification Search
USPC ................. 180/233, 245, 246, 248, 249, 244; 701/69, 72, 73, 89
See application file for complete search history.

(56) References Cited

U.S. PATENT DOCUMENTS

| | | | | |
|---|---|---|---|---|
| 4,981,191 A * | 1/1991 | Shibahata | ..................... | 280/245 |
| 6,105,703 A * | 8/2000 | Kuroda et al. | ................ | 180/248 |
| 6,817,434 B1 * | 11/2004 | Sweet | ........................... | 180/245 |
| 6,945,347 B2 * | 9/2005 | Matsuno | ....................... | 180/242 |
| 7,383,910 B2 * | 6/2008 | Mori et al. | ................... | 180/245 |
| 7,909,126 B2 * | 3/2011 | Gaffney | ........................ | 180/197 |
| 2005/0257988 A1 * | 11/2005 | Ohta et al. | .................... | 180/421 |
| 2006/0225938 A1 * | 10/2006 | Pichmann | ..................... | 180/245 |

FOREIGN PATENT DOCUMENTS

JP 3406169 B2 5/2003

* cited by examiner

*Primary Examiner* — Anne Marie Boehler
(74) *Attorney, Agent, or Firm* — Westerman, Hattori, Daniels & Adrian, LLP

(57) ABSTRACT

In the case where a difference between rotational speeds of right and left wheels detected by wheel speed sensors is less than a predetermined value, a right and left wheel power transmission control section distributes driving force between the right and left wheels so that a total value of the driving force of the right and left wheels does not exceed a limit value set up by a front and rear wheels power transmission control section. In the case where the difference between the rotational speeds of the right and left wheels is the predetermined value or more, the right and left wheel power transmission control section transmits the driving force up to a driving force upper limit for each wheel to the respective right and left rear wheels regardless of the total value of the driving force of the right and left rear wheels.

1 Claim, 7 Drawing Sheets

DRIVING FORCE DISTRIBUTION DEVICE

CROSS-REFERENCE TO RELATED APPLICATION

The present disclosure relates to subject matter contained in Japanese Patent Application No. 2009-090530, filed on Apr. 2, 2009, the disclosure of which is expressly incorporated herein by reference in its entirety.

BACKGROUND OF THE INVENTION

1. Field of the Invention

The present invention relates to a driving force distribution device that distributes driving force between right and left wheels of front wheels or rear wheels in a four-wheel drive vehicle, and particularly, the present invention relates to a driving force distribution device capable of canceling a limitation on driving force to be transmitted to right and left wheels on the basis of a difference between wheel speeds of right and left wheels.

2. Description of the Related Art

Heretofore, in order to distribute driving force transmitted from an engine (driving source) via a propeller shaft to right and left rear wheels, a four-wheel drive vehicle provided with a driving force distribution (torque distribution) device has been known (for example, see Japanese Patent No. 3406169, hereinafter, referred to as "Patent Literature 1"). In such a driving force distribution device, two clutches are respectively provided on the right and left of a hypoid gear or bevel gear coupled to a rear end portion of the propeller shaft. Such a driving force distribution device (or driving force control device) is provided within a rear differential of the four-wheel drive vehicle.

In this driving force control device for the four-wheel drive vehicle disclosed in Patent Literature 1, in order to make gears and/or clutches in the rear differential smaller, such control that the maximal transmitted torque for any clutch is reduced as vehicle speed is increased is carried out.

However, in a conventional control method as described in Patent Literature 1, the maximal transmitted torque to be transmitted to each of right and left rear wheels is first reduced, and engagement force of each of the right and left clutches of the rear differential is then increased or reduced within a range in which the engagement force does not exceed the maximal transmitted torque, by which a yaw motion of the four-wheel drive vehicle is controlled. For that reason, the maximal transmitted torque is to be reduced as the vehicle speed becomes faster. Thus, there has been a problem that it is hard to exert an effect obtained by controlling the yaw motion in such a situation.

Further, in the conventional driving force distribution device, in the case where an upper limit of the maximal transmitted torque for each of the right and left wheels is set to 1,200 Nm, for example, a hypoid gear portion to which the total torque of the rear wheels is transmitted has been designed to have a torque capacity (total torque capacity) of 2,400 Nm, for example, which is a sum of the upper limits of the maximal transmitted torque of both of the right and left wheels. However, the maximal driving torque of each of the right and left wheels required at straight ahead driving is different from the maximal driving torque of each of the right and left wheels required at turning driving. Therefore, the maximal torque actually needs not to be outputted to both of the right and left wheels at the same time, and the hypoid gear portion is allowed to reduce the torque capacity to the total torque capacity or less, for example, 1,600 Nm. It is desired to make the hypoid gear portion further smaller by designing it in this manner.

SUMMARY OF THE INVENTION

The present invention is made in view of the above points, and it is an object of the present invention to provide a driving force distribution device for a four-wheel drive vehicle capable of making a gear portion of a rear differential smaller and lighter while ensuring degrees of freedom of yaw motion control of the vehicle in a high vehicle speed region by controlling a total value of driving torque for each of right and left wheels so as not to exceed a limit value set up separately.

In order to solve the problem described above, the present invention is directed to a driving force distribution device for a four-wheel drive vehicle. The driving force distribution device according to the present invention is a driving force distribution device (100, DR) for a four-wheel drive vehicle (1), the driving force distribution device (100, DR) variably distributing driving force between front and rear wheels, the driving force distribution device (100, DR) being capable of distributing the driving force between right and left wheels (WRR, WRL) of one of the front and rear wheels.

The driving force distribution device according to the present invention includes wheel speed sensors (13) each detecting rotational speed of each of the right and left wheels (for example, WRR, WRL) to which the driving force can be distributed.

The driving force distribution device also includes a front and rear wheel power control section (100, Step S5) that sets up a limit value (for example, 1,600 Nm) for limiting driving force transmitted from a driving source (ENG) to the one of the front and rear wheels (WRR, WRL) in the case where a difference between the rotational speeds of the right and left wheels (WRR, WRL) detected by the wheel speed sensors (13) is less than a predetermined value.

The driving force distribution device also includes a right and left wheel power transmission control section (100, DR) for distributing the transmitted driving force between the right and left wheels (WRR, WRL) of the one of the front and rear wheels.

In the case where the difference between the rotational speeds of the right and left wheels (WRR, WRL) detected by the wheel speed sensors (13) is less than the predetermined value, the right and left wheel power transmission control section (100, DR) distributes the transmitted driving force between the right and left wheels (WRR, WRL) so that a total value of the driving forces of the right and left wheels (WRR, WRL) does not exceed the limit value set up by the front and rear wheels power transmission control section (100).

In the case where the difference between the rotational speeds of the right and left wheels (WRR, WRL) detected by the wheel speed sensors (13) is the predetermined value or more, the right and left wheel power transmission control section (100, DR) transmits the driving force up to a driving force upper limit (for example, 1,200 Nm, Steps S17, S19), which is set up in advance, for each wheel to the respective right and left rear wheels (WRR, WRL) regardless of the total value of the driving forces of the right and left rear wheels (WRR, WRL).

In this case, the driving force upper limit and the limit value may be set up so that the sum of the driving force upper limits of the right and left wheels (WRR, WRL) becomes larger than the limit value.

Since the driving force distribution device according to the present invention is constructed in this manner, it is possible to make a hypoid gear portion in a rear differential smaller and lighter while ensuring degrees of freedom of yaw motion control of the four-wheel drive vehicle even in a high vehicle speed region by controlling the total value of driving torques of the right and left wheels so as not to exceed the predetermined limit value without uniformly limiting the maximal transmitted torque of each clutch in the rear differential as well as the conventional method.

Further, in the case where it is determined that the four-wheel drive vehicle is in such a driving condition that one of the right and left wheels is spun (for example, a right and left split μ road (dynamically frictional road)) on the basis of the difference between the wheel speeds by comparing the wheel speeds of the right and left rear wheels, it is possible to ensure a mobility performance similar to that in the conventional method by canceling a limitation on the total value of driving torques of the right and left wheels.

In this regard, reference numerals in parenthesis described above exemplify, for reference, corresponding components and steps of a process of embodiments (will be described later). Further, the driving force (driving torque) and the like in parenthesis described above exemplify ones corresponding to the embodiment described later.

According to the present invention, it is possible to provide a driving force distribution device for a four-wheel drive vehicle capable of making a gear portion of a rear differential smaller and lighter while striking a balance between a mobility performance and a turning performance the same as or more than those in a conventional driving force distribution device.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 6A shows a state of torque distribution of the four-wheel drive vehicle at low-speed straight ahead driving, and FIG. 6B shows a state of torque distribution of the four-wheel drive vehicle at high-speed turning driving.

DETAILED DESCRIPTION OF THE INVENTION

Hereinafter, a preferred embodiment of a driving force distribution device according to the present invention will be described in detail with reference to the appending drawings. The driving force distribution device according to the present invention is applied to, for example, a rear differential of a four-wheel drive vehicle, which distributes driving force between right and left rear wheels.

Figure 1:
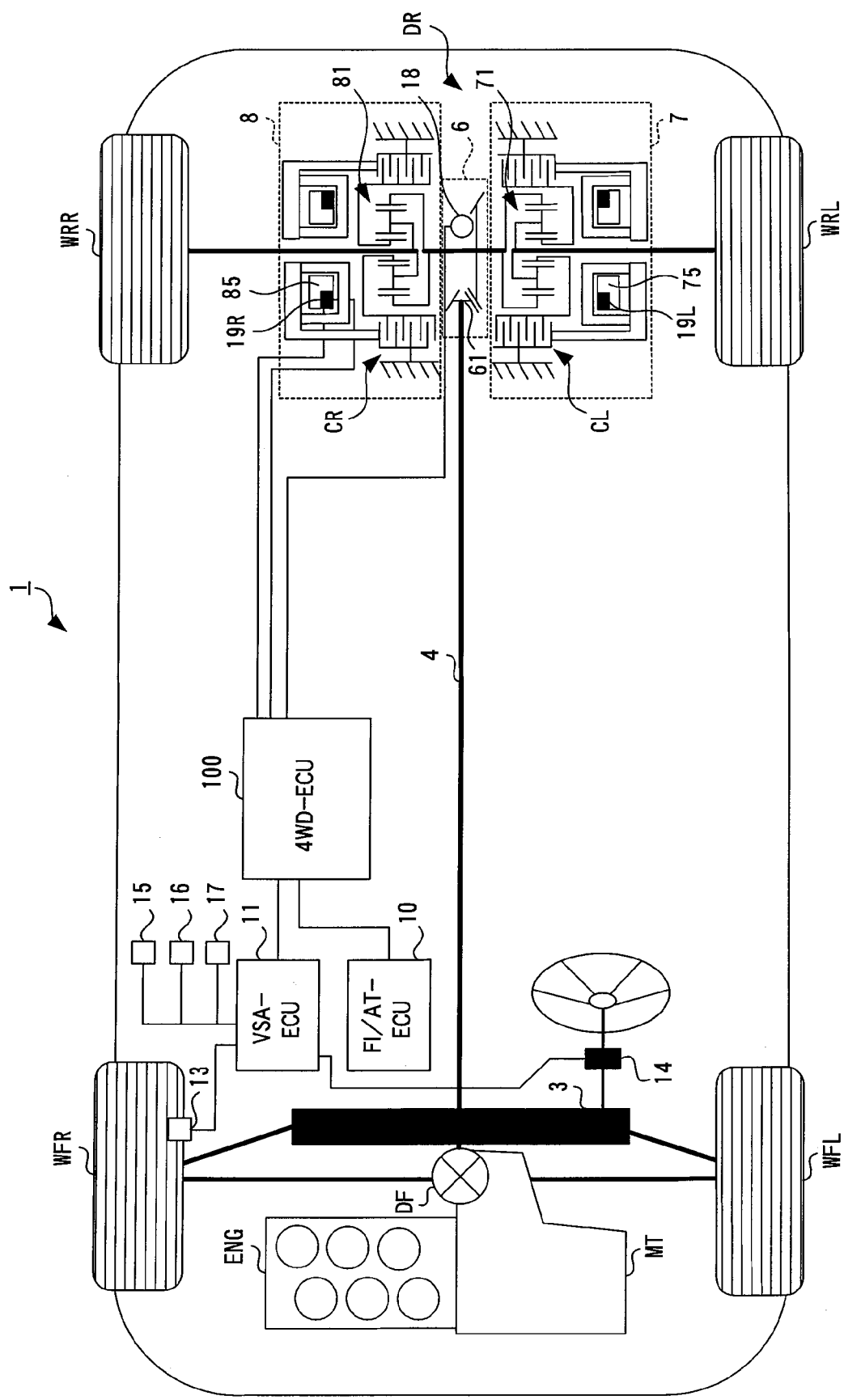
FIG. 1 is a schematic diagram showing a system summary of a four-wheel drive vehicle.

FIG. 1 is a schematic diagram showing a system summary of a four-wheel drive vehicle 1 to which the driving force distribution device according to the present invention is applied. As shown in FIG. 1, the four-wheel drive vehicle 1 includes: an engine ENG (driving source); a transmission MT; a front differential DF; a propeller shaft 4; and a rear differential DR. The engine ENG is transversely mounted in the front of a vehicle body. The transmission MT is integrally provided with the engine ENG. The front differential DF causes the transmission MT to be connected to front drive shafts 2R, 2L for right and left front wheels WFR, WFL. The propeller shaft 4 is provided for connecting the front differential DF to right and left rear wheels WRR, WRL. The rear differential DR causes the propeller shaft 4 to be connected to rear drive shafts 5R, 5L for right and left rear wheels WRR, WRL. The rear differential DR can control distribution of driving force between the rear drive shafts 5R, 5L.

In addition, the four-wheel drive vehicle 1 includes a steering device 3 for changing a direction of the front wheels WFR, WFL, and various electronic control units (ECU) 10, 11, and 100. In the electronic control units, an FI/AT-ECU 10 for controlling an operation of the engine ENG and the transmission MT, a VSA (vehicle stability assist system)-ECU 11 for controlling an operation of a VSA (vehicle stability assist system) system, and a 4WD-ECU 100 that carries out driving force distribution between the front and rear wheels WFR, WFL and WRR, WRL and between the right and left rear wheels WRR, WRL are included. Each of the FI/AT-ECU 10 and VSA-ECU 11 is electrically connected to the 4WD-ECU 100 via a CAN (Controller Area Network), which is a communications protocol for the four-wheel drive vehicle 1. In this regard, the 4WD-ECU 100 functions as a front and rear wheel power control section and a right and left wheel power transmission control section of the present invention in the present embodiment.

A wheel speed sensor 13 for detecting rotational speed of a wheel (wheel speed) is provided in the vicinity of each of the front wheels WFR, WFL and the rear wheels WRR, WRL. Each of the wheel speed sensors 13 is electrically connected to the VSA-ECU 11. In this regard, FIG. 1 illustrates only one wheel speed sensor 13 provided in the vicinity of the right front wheel WFR. A steering angle sensor 14 for detecting a steering angle of the front wheels WFR, WFL is provided in the vicinity of the steering device 3. The steering angle sensor 14 is electrically connected to the VSA-ECU 11. In addition, as shown in FIG. 1, a yaw rate sensor 15 for detecting a yaw rate of the four-wheel drive vehicle 1, a lateral G sensor 16 for detecting lateral G (actual lateral acceleration) that exerts the four-wheel drive vehicle 1, and a longitudinal G sensor 17 for detecting longitudinal G (actual longitudinal acceleration) that exerts the four-wheel drive vehicle 1 are provided in this four-wheel drive vehicle 1. Each of the sensors 15, 16, 17 is electrically connected to the VSA-ECU 11.

As will be described later, the 4WD-ECU 100 controls operations of right and left multiplate clutches (for example, electromagnetic clutches) CL, CR provided in the rear differential DR on the basis of the respective detected signals outputted from the sensors 13 to 17 and inputted via the VSA-ECU 11. More specifically, the 4WD-ECU 100 calculates a torque command value for each of the multiplate clutches CL, CR on the basis of data such as the vehicle speed, the longitudinal G, the lateral G, the wheel speed, the yaw rate and the engine torque.

Figure 2:
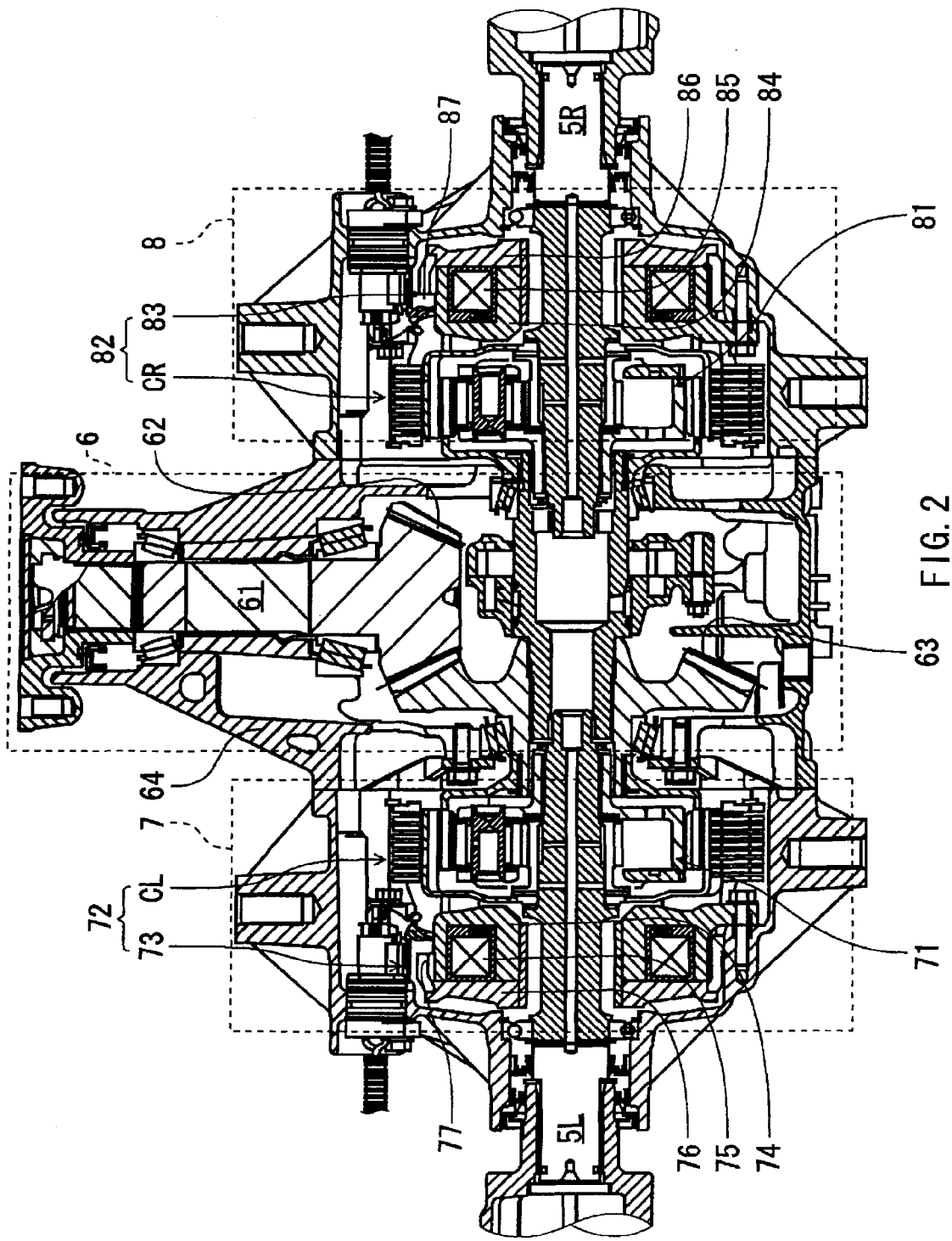
FIG. 2 is a partially sectional view showing the whole configuration of a rear differential in the four-wheel drive vehicle.

Next, a structure of the rear differential DR will be described on the basis of FIG. 1 and FIG. 2. In this regard, since the rear differential DR has a substantially symmetrical structure, one (left side in the present embodiment) of right and left sides about symmetrical portions will be explained, and repetition of explanation is omitted. FIG. 2 is a partially sectional view showing the whole configuration of the rear differential DR in the four-wheel drive vehicle 1 shown in FIG. 1.

The rear differential DR is constructed from a hypoid gear portion 6, left-wheel torque transmitting section 7 and right-wheel torque transmitting section 8 that are provided right and left of this hypoid gear portion 6. The hypoid gear portion 6 includes a hypoid pinion gear 62 formed at a tip of an input shaft (hypoid pinion shaft) 61, which is coupled to the propeller shaft 4. The hypoid pinion gear 62 engages with a hypoid ring gear 63 coaxial to the rear drive shafts 5R, 5L. The driving force transmitted from the propeller shaft 4 via the hypoid pinion shaft 61 is transmitted from the hypoid pinion gear 62 to the hypoid ring gear 63.

The left-wheel torque transmitting section 7 and the right-wheel torque transmitting section 8 respectively include planetary gear sets 81, 71 each connected to one end of the hypoid ring gear 63. The driving force from the hypoid ring gear 63 is inputted to ring gears of the planetary gear sets 81, 71. As shown in a skeleton diagram of FIG. 1, sun gears of the planetary gear sets 81, 71 are rotatably provided around the rear drive shafts 5L, 5R, respectively. Planetary carriers of the planetary gear sets 81, 71 are respectively fixed to the rear drive shafts 5L, 5R. In each of the planetary gear sets 81, 71, planetary gears supported by the planetary carrier engage with both the sun gear and the ring gear. The planetary gear sets 81, 71 are respectively connected to clutch mechanisms (or brake mechanisms) 82, 72, each of which is provided for variably controlling torque of the sun gear.

The clutch mechanisms 82, 72 respectively include wet type multiplate clutches (wet type multiplate brakes) CL, CR, and electromagnetic actuators 83, 73 for operating the multiplate clutches CL, CR. A plurality of brake plates provided in each of the wet type multiplate brakes CL, CR are fixed on a casing 64, and a plurality of brake discs arranged alternately with these brake plates are fixed on the sun gear of each of the planetary gear sets 81, 71.

The electromagnetic actuators 83, 73 are respectively constructed from: ring-like cores (yokes) 84, 74 each having an annular groove; circular solenoids (circular exciting coil, hereinafter, referred to as "electromagnetic coil") 85, 75 respectively inserted into the annular grooves of the ring-like cores 84, 74; ring-like armatures 86, 76 respectively facing the ring-like cores 84, 74 with a predetermined gap; and annular pistons 87, 77 respectively connected to the ring-like armatures 86, 76. Since the electromagnetic actuators 83, 73 have such a structure, clutch torques generated in the multiplate clutches CL, CR are respectively amplified by the planetary gear sets 81, 71 and outputted to the right and left rear drive shafts 5L, 5R.

Here, for example, an operation of the rear differential DR when the four-wheel drive vehicle 1 is turned to the right will be described. The 4WD-ECU 100 controls so that a larger amount of current flows into the left side solenoid 75 of the rear differential DR than that into the right side solenoid 85. This causes the multiplate clutch CL of the left side clutch mechanism 72 to engage more firmly than the multiplate clutch CR of the right side clutch mechanism 82. More specifically, the 4WD-ECU 100 sets up the respective current values for the right and left side solenoids 85, 75 so that the current into the left side circular solenoid 75 becomes larger than the current into the right side circular solenoid 85. When the currents with the current value set up for the respective circular solenoids 85, 75 are supplied, electromagnetic force is generated in each of the circular solenoids 85, 75. The generated electromagnetic forces respectively causes the armatures 86, 76 to be attracted to the ring-like cores 84, 74, thereby generating thrust of the vehicle. This thrust causes the annular pistons 87, 77 integrally connected to the armatures 86, 76 to press the multiplate clutches CL, CR, respectively. Thus, brake torque is generated in each of the multiplate clutches CL, CR. In this case, the brake torque generated in the multiplate clutch CL becomes larger than the brake torque generated in the multiplate clutch CR in accordance with the magnitude of the generated electromagnetic force. The brake torques cause the sun gears of the right and left planetary gear sets 81, 71 to be fixed onto the casing 64. At this time, driving force transmitted from the hypoid pinion shaft 61 is transmitted to the rear drive shafts 5L, 5R via the ring gears, the planetary gears and the planetary carrier of the planetary gear sets 81, 71. On the basis of a difference between the magnitudes of brake torques as described above, the driving force transmitted from the hypoid pinion shaft 61 is distributed so that the driving force to be transmitted to the left side rear drive shaft 5L from the propeller shaft 4 is larger than the driving force to be transmitted to the right side rear drive shaft 5R. Therefore, by increasing rotation of the left rear wheel WRL compared with that of the right rear wheels WRR, it is possible to cause the four-wheel drive vehicle 1 to turn appropriately. Thus, in the driving force distribution device according to the present embodiment, by controlling the current values to flow into the circular solenoid 85, 75, it is possible to distribute the driving force of the propeller shaft 4 to the rear drive shafts 5L, 5R arbitrarily. Therefore, it is possible to achieve suitable turning control.

In this regard, as shown in FIG. 1, an oil temperature sensor 18 is attached at a predetermined site in the rear differential DR. The oil temperature sensor 18 detects oil temperature of hydraulic oil used for the wet type multiplate clutches CL, CR. Further, right and left search coils 19R, 19L are provided in the vicinity of the circular solenoids 85, 75. The right and left search coils 19R, 19L detect electromagnetic forces generated by the circular solenoids 85, 75 (generated magnetic fields), respectively. More specifically, each of the search coils 19R, 19L detects the electromagnetic force generated by the corresponding circular solenoid 85, 75 on the basis of electromotive force generated due to temporal variation in magnetic flux density that passes through a corresponding air core. The detected values of the oil temperature sensor 18 and the right and left search coils 19R, 19L are outputted to the 4WD-ECU 100.

Figure 3:
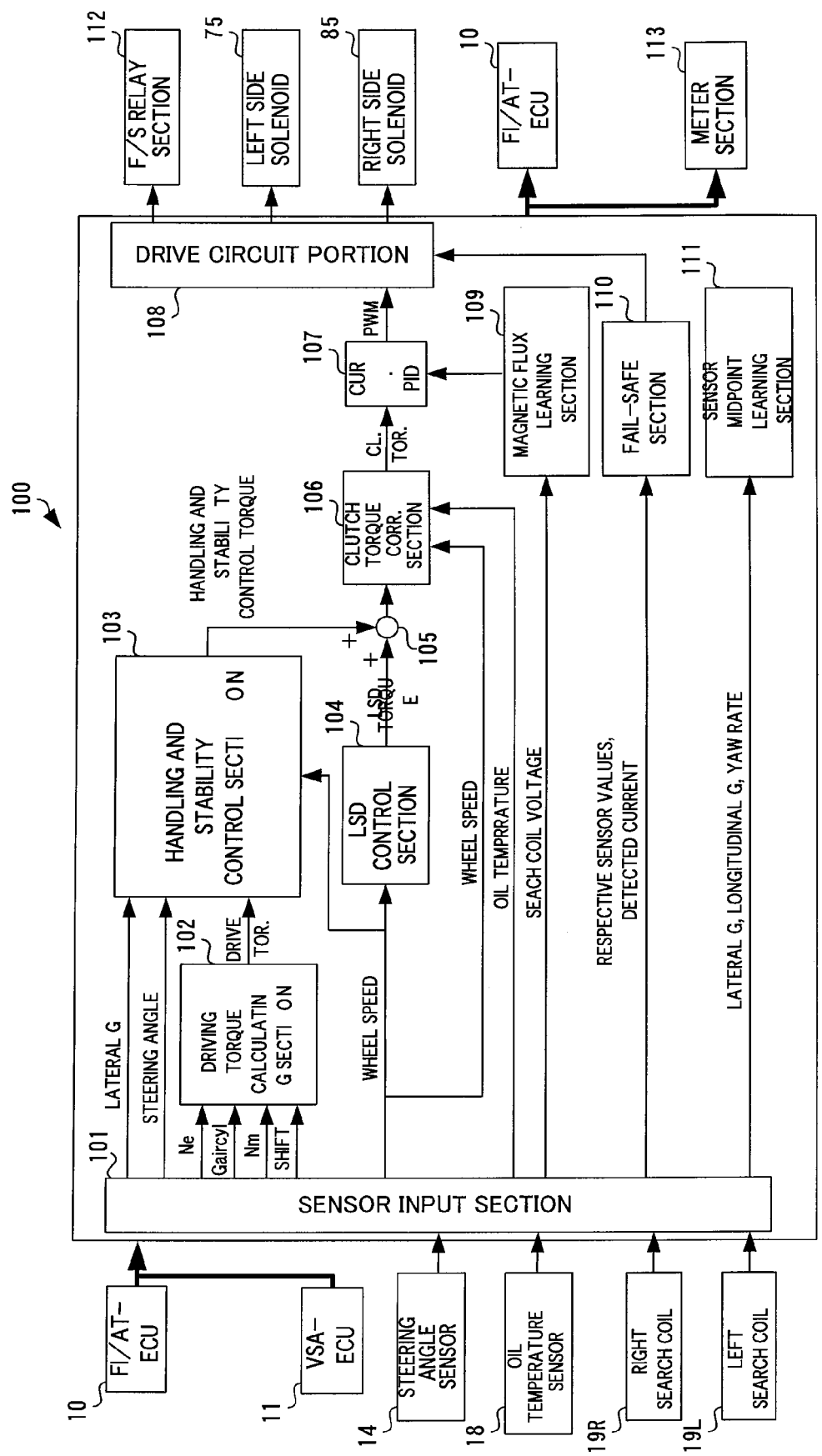
FIG. 3 is a control block diagram of a 4WD-ECU shown in FIG. 1.

Next, control of the 4WD-ECU 100 according to the present embodiment will be described. FIG. 3 is a control block diagram of the 4WD-ECU 100 shown in FIG. 1. As shown in FIG. 3, various kinds of information are inputted into the sensor input section 101 of the 4WD-ECU 100 from the FI/AT-ECU 10 and the VSA-ECU 11 using a so-called CAN (Controller Area Network). The various kinds of information inputted from the FI/AT-ECU 10 include the number of revolutions Ne of the engine ENG (the number of revolutions of an output shaft of the engine ENG), a cylinder intake air amount Gaircyl, the number of revolutions Nm of a main shaft of a torque converter (not shown in the drawings), a shift position of a shift lever (not shown in the drawings), temperature of coolant for the engine ENG and the like. The kinds of information are detected by corresponding sensors (not shown in the drawings), and inputted into the FI/AT-ECU 10. Further, the kinds of information inputted from the VSA- ECU 11 include the wheel speed (rotational speed of each wheel) detected by the wheel speed sensor 13, the yaw rate detected by the yaw rate sensor 15, the lateral G detected by the lateral G sensor 16, the longitudinal G detected by the longitudinal G sensor 17 and the like.

In this regard, the amount of air that the engine ENG breathes and the cylinder intake air amount Gaircyl are calculated by the FI/AT-ECU 10. More specifically, the cylinder intake air amount Gaircyl is calculated on the basis of the amount of air measured by an air flow meter (not shown in the drawings) provided in air piping to the engine ENG, variation in pressure per unit time measured by a pressure sensor (not shown in the drawings) provided in this air piping and the like.

Further, the steering angle detected by the steering angle sensor 14, the temperature of hydraulic oil in the rear differential DR (wet type multiplate clutches CL, CR) detected by the oil temperature sensor 18, the voltage value (induced voltage) detected by the left search coil 19L, the voltage value (induced voltage) detected by the right search coil 19R and the like are inputted into the sensor input section 101.

The number of revolutions Ne of the engine ENG, the cylinder intake air amount Gaircyl, the number of revolutions Nm of the main shaft, and the shift position are inputted from the sensor input section 101 into the driving torque calculating section 102. The driving torque calculating section 102 calculates estimated driving torque by the engine ENG on the basis of the respective inputted data, and outputs the calculated estimated driving torque to the handling and stability control section 103.

The estimated driving torque of the engine ENG outputted from the driving torque calculating section 102, the lateral G outputted from the sensor input section 101, the steering angle and the wheel speed (rotational speed of each wheel) are inputted into the handling and stability control section 103. The handling and stability control section 103 calculates handling and stability control torque on the basis of the respective data thus inputted, and outputs the calculated handling and stability control torque to the torque adding section 105. Further, the wheel speed (rotational speed of each wheel) is inputted from the sensor input section 101 into the LSD control section 104. The LSD control section 104 calculates, on the basis of the inputted wheel speeds of the four wheels (front and rear and right and left wheels), LSD control torque for applying a limited slip effect to the rear differential DR if needed, and outputs the calculated LSD control torque to the torque adding section 105.

The torque adding section 105 corrects the torque by adding the handling and stability control torque from the handling and stability control section 103 into the LSD control torque from the LSD control section 104, and outputs the added torque (adding torque) to the clutch torque correcting section 106. Further, the added torque from the torque adding section 105 is inputted into the clutch torque correcting section 106, and the wheel speeds and the oil temperature of the hydraulic oil are also inputted into the clutch torque correcting section 106 from the sensor input section 101. The clutch torque correcting section 106 calculates clutch torque for each of the multiplate clutches CL, CR in the rear differential DR on the basis of the added torque, the wheel speed and the oil temperature of the hydraulic oil, and outputs the calculated clutch torques to the current outputting section 107.

The current outputting section 107 calculates driving current values (duty ratios of PWM control) for the right electromagnetic coil 85 and left electromagnetic coil 75 for obtaining the clutch torques calculated by the clutch torque correcting section 106, and outputs the calculated driving current values to the drive circuit portion 108. The drive circuit portion 108 then outputs driving currents with the driving current values calculated by the current outputting section 107 to the right electromagnetic coil 85 and left electromagnetic coil 75, respectively. Thus, by causing the driving current to flow into each of the electromagnetic coils 85, 75 in the rear differential DR on the basis of control of the 4WD-ECU 100, the driving force from propeller shaft 4 is distributed between the rear wheels WRR, WRL.

In this regard, the magnetic flux learning section 109 learns magnetic flux (magnetic flux density) passing through air cores of the right and left search coils 85, 75 on the basis of the search coil voltages of the search coils 19R, 19L inputted from the sensor input section 101 and the driving current values of the right and left electromagnetic coils 85, 75 outputted from the drive circuit portion 108. The magnetic flux learning section 109 estimates a value of an air gap between each of the right and left electromagnetic coils 85, 75 and the corresponding armature 86, 76 on the basis of the magnetic flux detected by each of the search coils 19R, 19L, and detects variation in the value of the air gap. Such variation in the air gap is generated due to attrition of the multiplate clutch CL, CR, for example. The magnetic flux learning section 109 learns and corrects an I-T map on the basis of the value of the estimated air gap. The magnetic flux learning section 109 then calculates a current corrected value for correcting the driving current value of each of the right and left electromagnetic coils 85, 75 on the basis of the learned I-T map and the driving current values of the right and left electromagnetic coils 85, 75, and outputs the calculated current corrected values to the current outputting section 107. The current outputting section 107 corrects the driving current value for obtaining desired electromagnetic force in each of the right and left electromagnetic coils 85, 75 in accordance with this current corrected value.

Further, the value detected by the respective sensors, the detected currents and the like are inputted into the fail-safe section 110 from the sensor input section 101. In the case where these data indicate predetermined conditions such as failure, the fail-safe section 110 outputs a fail-safe action signal to the drive circuit portion 108. When the fail-safe action signal is inputted into the drive circuit portion 108, the drive circuit portion 108 outputs a relay driving current to an F/S relay section 112. When the relay driving current flows into the F/S relay section 112, the F/S relay section 112 operates so that no driving current flows into each of the right and left electromagnetic coils 85, 75. At this time, the 4WD-ECU 100 outputs a torque down request signal to the FI/AT-ECU 10, and outputs a warning light display signal to a meter section 113. The FI/AT-ECU 10 then controls the engine ENG and the transmission MT so as to gradually reduce driving torque. A warning light (or a warning lamp) is turned on in the meter section 113 provided at a driver's seat of the four-wheel drive vehicle 1. In this regard, for example, in the case where a vehicle stability assist system (vehicle stability assist system) including ABS (antilock brake system) is turned off, in the case where a 4WD system of the four-wheel drive vehicle 1 is broken or damaged (or has a failure), or in the case where the hydraulic oil temperature detected by the oil temperature sensor 18 becomes predetermined temperature or higher and the multiplate clutches CL, CR are to be protected, the torque down request signal is outputted to the FI/AT-ECU 10 from the 4WD-ECU 100.

Further, the yaw rate, the lateral G, and the longitudinal G are inputted from the sensor input section 101 to the sensor midpoint learning section 111. The sensor midpoint learning section 111 carries out a midpoint learning operation for each of the yaw rate sensor 15, the lateral G sensor 16 and the longitudinal G sensor 17. In this regard, a midpoint of each sensor acquired in the midpoint learning operation by the sensor midpoint learning section 111 is stored in a memory (not shown in the drawings), and detected value of each sensor is corrected on the basis of the midpoint of the sensor stored in this memory.

Figure 4:
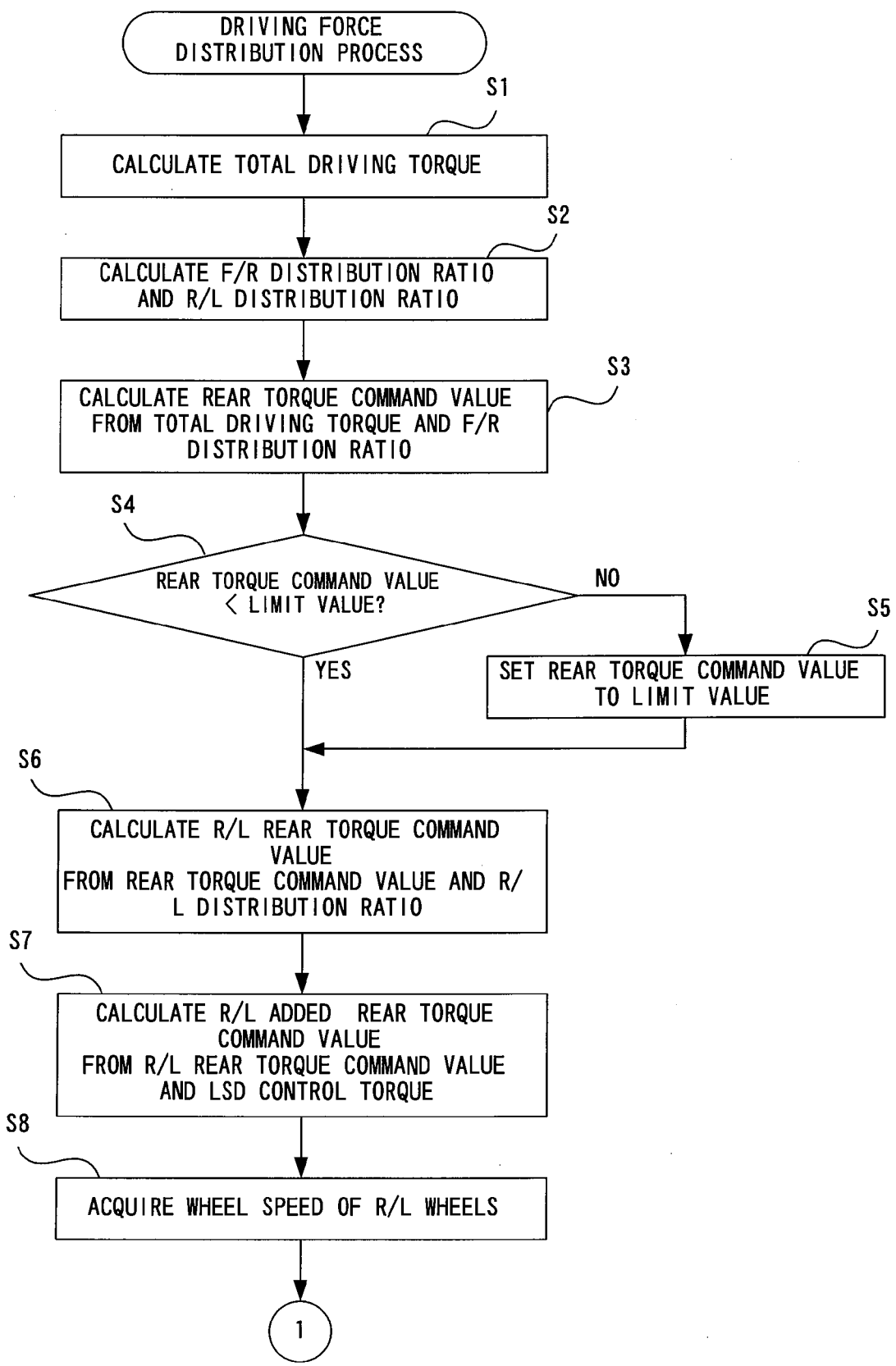
FIG. 4 is a flowchart of a driving force distribution process carried out by the 4WD-ECU.
Figure 5:
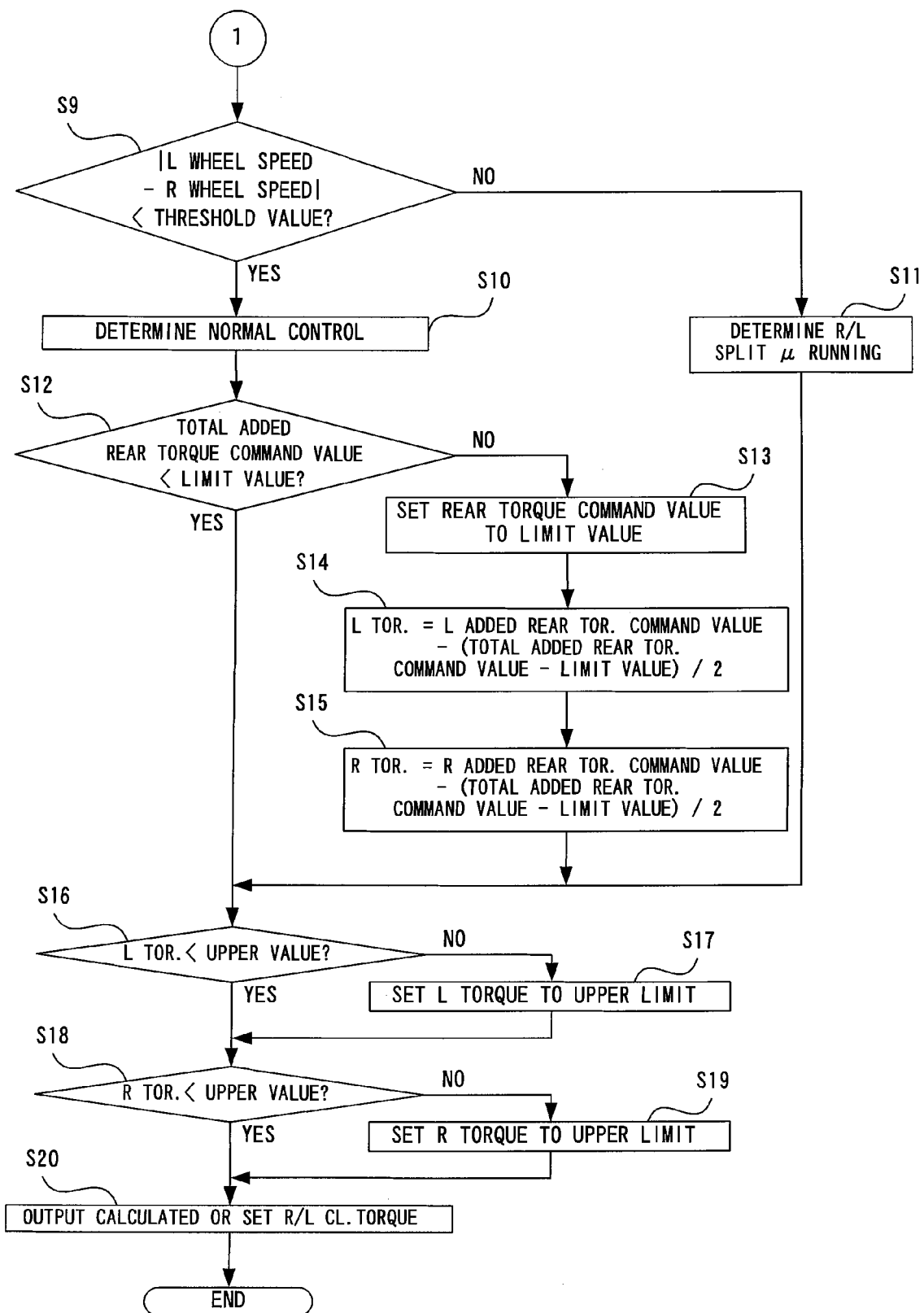
FIG. 5 is a flowchart of a driving force distribution process carried out by the 4WD-ECU.

Next, an operation of the driving force distribution device according to the present embodiment will be described on the basis of FIG. 3 to FIG. 5. FIG. 4 and FIG. 5 are a flowchart of a driving force distribution process carried out by the 4WD-ECU 100. This driving force distribution process is always carried out by the 4WD-ECU 100 while the four-wheel drive vehicle 1 is moving.

In the 4WD-ECU 100, the driving torque calculating section 102 first calculates, on the basis of the number of revolutions Ne of the engine ENG inputted from the sensor input section 101 and the like, total driving torque from which a loss of torque, such as friction torque, is removed (Step S1), and outputs the calculated total driving torque to the handling and stability control section 103. The handling and stability control section 103 calculates, on the basis of the lateral G, the steering angle and the wheel speeds inputted from the sensor input section 101, a distribution ratio of the driving torque between the front and rear wheels (front-to-rear distribution ratio) and a distribution ratio of the driving torque between the right and left wheels WRR, WRL of the rear wheels (right-to-left distribution ratio) (Step S2). The handling and stability control section 103 then calculates a rear torque command value (total torque command value of the right and left rear wheels) on the basis of the total driving torque and the front-to-rear distribution ratio calculated in this manner (Step S3). In this regard, more specifically, the distribution of driving forces between the front and rear wheels and between right and left wheels is set up in accordance with lateral G for control in which the lateral G inputted from the sensor input section 101 and lateral G calculated from a steering angle are added at a predetermined ratio. Further, the distribution of driving force between the right and left wheels is set to a fixed ratio when the lateral G is not applied to the vehicle.

The handling and stability control section 103 then determines whether the torque command value of the total rear wheels calculated at Step S3 is smaller than a limit value set up in advance or not (Step S4). In the case where it is determined that the rear torque command value is less than the limit value, the processing flow directly shifts to Step S6. On the other hand, in the case where it is determined that the rear torque command value is not smaller than the limit value, that is, the rear torque command value is the limit value or more, the handling and stability control section 103 sets the torque command value of the total rear wheels to the limit value (Step S5), the processing flow shifts to Step S6. Thus, in the driving force distribution process according to the present embodiment, the handling and stability control section 103 is adapted to limit the rear torque command value without a difference between wheel speeds of the right and left rear wheels WRR, WRL.

Subsequently, the handling and stability control section 103 calculates a rear torque command value of each of the right and left rear wheels WRR, WRL on the basis of the right-to-left distribution ratio calculated at Step S2, the rear torque command value calculated at Step S3 or the limit value set up at Step S5 (Step S6), and outputs the rear torque command values of the right and left rear wheels WRR, WRL thus calculated to the torque adding section 105. The torque adding section 105 adds the rear torque command values of the right and left rear wheels WRR, WRL inputted from the handling and stability control section 103 to the LSD control torque inputted from the LSD control section 104 to calculate a right and left added rear torque command value (Step S7), and outputs the right and left added rear torque command value thus calculated to the clutch torque correcting section 106.

The clutch torque correcting section 106 acquires wheel speed, which is inputted from the sensor input section 101, of each of the right and left wheels WRR, WRL (Step S8), and determines whether an absolute value of a difference between the wheel speeds of the right and left rear wheels WRR, WRL is smaller than a predetermined threshold value set up in the 4WD-ECU 100 in advance or not (Step S9). In the case where it is determined that this difference between the wheel speeds is smaller than the threshold value, the clutch torque correcting section 106 determines that control for each of the multiplate clutches CL, CR in the rear differential DR is carried out by normal control (Step S10). Here, the "limit value of the rear torque command value" is a value of 1,600 Nm, for example, and, as will be described later, is smaller than twice as large as a torque value permissible for each of the right and left rear wheels WRR, WRL, that is, a torque total value (2,400 Nm) when the maximal transmitted torque (in the present embodiment, 1,200 Nm) is distributed to both of the right and left rear wheels WRR, WRL. Thus, by setting the driving torque to be transmitted to the rear differential DR to the total value of the maximal torque, which can be applied to each of the right and left rear wheels WRR, WRL, or less, it is possible to make the hypoid gear portion 6 of the rear differential DR smaller and lighter.

On the other hand, in the case where it is determined at Step S9 that the absolute value of the difference between the wheel speeds of the right and left rear wheels WRR, WRL is not smaller than the predetermined threshold value, that is, the difference between the wheel speeds is the predetermined threshold value or more, the clutch torque correcting section 106 determines that the four-wheel drive vehicle 1 is in a right and left split μ driving condition (Step S11). As the case where the difference is generated between the wheel speeds of the right and left rear wheels WRR, WRL, for example, it is thought that there is a large difference between coefficients of friction (μ) of contact areas that the right and left rear wheels WRR, WRL respectively contact, and one of the right and left rear wheels WRR, WRL is spun. In such a case, without setting a limit value to an added rear torque command value, the processing flow shifts to Step S16.

Subsequently, the clutch torque correcting section 106 determines whether a total of the right and left added rear torque command values is smaller than the limit value of the rear torque command value described above or not (Step S12). In the case where it is determined that this total of the added rear torque command values is smaller than the limit value, the processing flow directly shifts to Step S16. On the other hand, in the case where it is determined that the total of the added rear torque command values is not smaller than the limit value, the clutch torque correcting section 106 sets the torque command value of the total rear wheels to the limit value again (Step S13), and subtracts a half of a value obtained by subtracting the limit value from the total of the added rear torque command values from the added rear torque command value of the left rear wheel WRL to calculate a driving torque command value to the left rear wheel WRL (Step S14). The clutch torque correcting section 106 also subtracts a half of a value obtained by subtracting the limit value from the total of the added rear torque command values from the added rear torque command value of the right rear wheel WRR to calculate a driving torque command value to the right rear wheel WRR (Step S15).

The clutch torque correcting section 106 then determines whether the added rear torque command value of the left rear wheel WRL calculated at Step S7 or the driving torque command value to the left rear wheel WRL calculated at Step S14 is smaller than a predetermined upper limit set up in advance or not (Step S16). In the case where it is determined that the driving torque command value of the left rear wheel WRL is smaller than the upper limit, the processing flow directly shifts to Step S18. In the case where it is determined that the driving torque of the left rear wheel WRL is the upper limit or more, the clutch torque correcting section 106 sets up this upper limit as the driving torque command value of the left rear wheel WRL in place of the driving torque command value of the left rear wheel WRL calculated as described above (or the added rear torque command value of the left rear wheel WRL) (Step S17), the processing flow shifts to Step S18.

Subsequently, the clutch torque correcting section 106 determines whether the added rear torque command value of the right rear wheel WRR calculated at Step S7 or the driving torque command value to the right rear wheel WRR calculated at Step S15 is smaller than a predetermined upper limit set up in advance or not (Step S18). In the case where it is determined that the driving torque command value for the right rear wheel WRR is smaller than the upper limit, the processing flow directly shifts to Step S20. In the case where it is determined that the driving torque command value of the right rear wheel WRR is the upper limit or more, the clutch torque correcting section 106 sets up this upper limit as the driving torque command value of the right rear wheel WRR in place of the driving torque command value of the right rear wheel WRR calculated as described above (or the added rear torque command value of the right rear wheel WRR) (Step S19), the processing flow shifts to Step S20. In this regard, the upper limit of the driving torque command value of the right rear wheel WRR is the same value as that of the left rear wheel WRL, and the left-wheel torque transmitting section 7 and right-wheel torque transmitting section 8 in the rear differential DR are designed so that a problem such as failure does not occur even when driving torque with this upper limit is transmitted to any of the right and left rear wheels WRR, WRL.

Finally, the clutch torque correcting section 106 outputs the added rear torque command value of the right and left rear wheels WRR, WRL calculated at Step S10, the driving torque command value of the right and left rear wheels WRR, WRL calculated at Step S14 or S15, or the added rear torque command value of the upper limit set up at Step S17 or S19 to the current outputting section 107 as the clutch torques of the right and left rear wheels WRR, WRL (Step S20), and this driving force distribution process is terminated. In this regard, since the processes after the current outputting section 107 are carried out using FIG. 3 as described above, its explanation is omitted here.

Here, one example of calculation of the driving torque command values for the right and left rear wheels WRR, WRL in the driving force distribution process will be described. For example, rear torque command values for the right and left rear wheels WRR, WRL are respectively calculated as 900 Nm, 0 Nm in the handling and stability control section 103 (Step S6), and LSD control torques for the right and left rear wheels WRR, WRL are calculated as 500 Nm, 500 Nm in the LSD control section 104. Thus, the added rear torque command values of the right and left rear wheels WRR, WRL are respectively calculated as 1,400 Nm, 500 Nm (Step S7). In this case, the total of the added rear torque command values becomes 1,900 Nm, and is the limit value (1,600 Nm) or more ("No" at Step S12). Therefore, the driving torque command value of the left rear wheel WRL is calculated as 1,400 Nm−(1,900 Nm−1,600 Nm)/2=1,250 Nm (Step S14), and the driving torque command value of the right rear wheel WRR is calculated as 500 Nm−(1,900 Nm−1,600 Nm)/2=350 Nm (Step S15). Here, since the driving torque command value of the left rear wheel WRL is the upper limit (1,200 Nm) or more ("No" at Step S16), the driving torque command value of the left rear wheel WRL is set to 1,200 Nm, which is the upper limit (Step S17). Finally, the driving torque command values of 1,200 Nm, 350 Nm are outputted for the right and left rear wheels WRR, WRL. In the present embodiment, the total of the driving torque command values for the right and left rear wheels WRR, WRL is set to the limit value or less, and each of the driving torque command values is also set to the upper limit or less in the clutch torque correcting section 106. Therefore, it is possible to make the hypoid gear portion 6 smaller and lighter while ensuring the degrees of freedom of yaw motion control of the four-wheel drive vehicle 1 even in a high vehicle speed region.

Figure 6B:
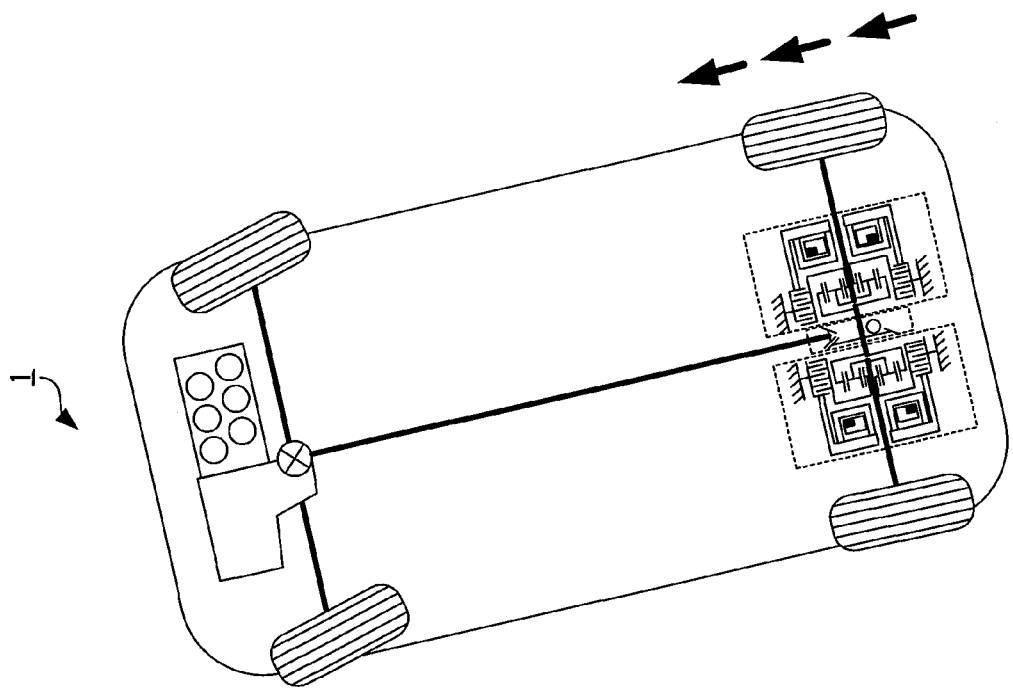
FIGS. 6A and 6B are schematic views showing one example of the cases where rear wheels are not spun.
Figure 6A:
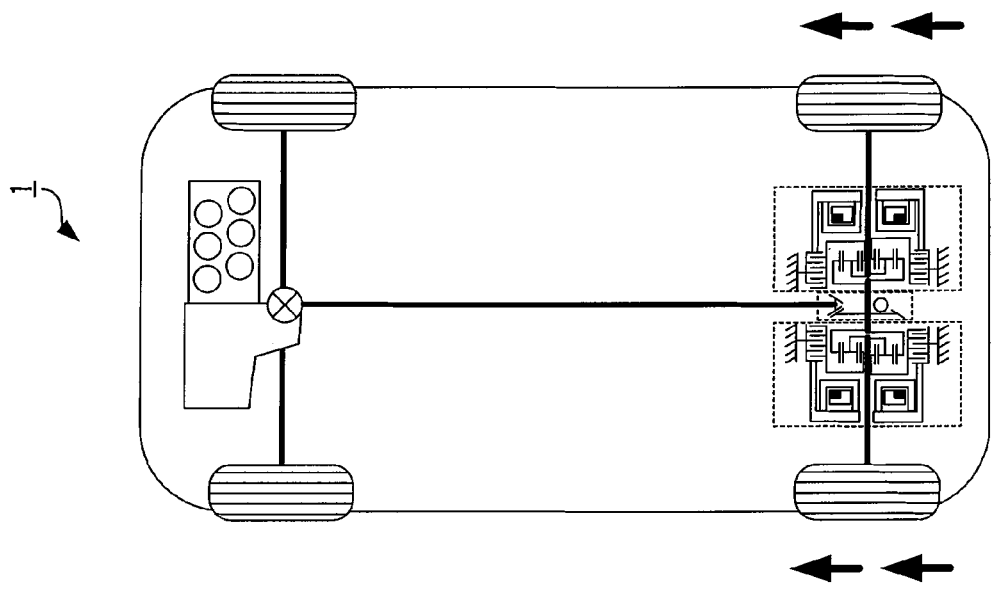
Figure 7:
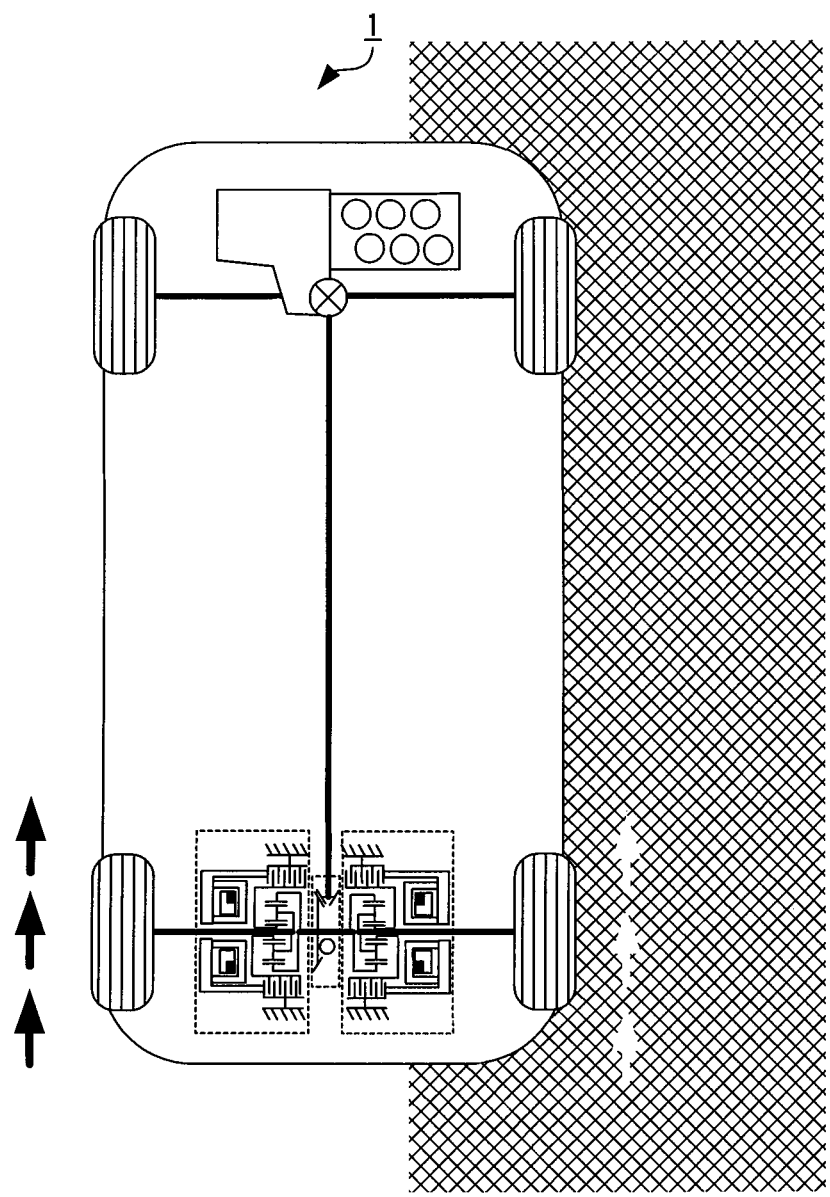
FIG. 7 is a schematic view showing a state of torque distribution of the four-wheel drive vehicle in the case where the rear wheels are spun (for example, the case where μ (dynamic coefficient of friction) of right and left wheels is different from each other).

Next, states where the driving force distribution process according to the present embodiment is actually applied to the four-wheel drive vehicle 1 will be described. FIGS. 6A and 6B are schematic views showing one example of the cases where each of the rear wheels WRR, WRL of the four-wheel drive vehicle 1 is not spun. FIG. 6A shows a state of torque distribution of the four-wheel drive vehicle 1 at low-speed straight ahead driving, and FIG. 6B shows a state of torque distribution of the four-wheel drive vehicle 1 at high-speed turning driving. Further, FIG. 7 is a schematic view showing a state of torque distribution of the four-wheel drive vehicle 1 in the case where any of the rear wheels WRR, WRL of the four-wheel drive vehicle 1 is spun (in particular, the case where μ of contact areas of the right and left wheels WRR, WRL is different from each other). Hereinafter, a state of torque distribution in some situations will be described while comparing technique of the conventional method with technique of the present invention.

In this regard, on the premise of the conventional method, driving torque of each of the right and left rear wheels WRR, WRL is limited to 1,200 Nm (upper limit) or less at low-speed driving, for example, and driving torque transmitted to the hypoid gear portion 6 is limited to a total of upper limits of the right and left rear wheels WRR, WRL, that is, 2,400 Nm (limit value). The driving torque of each of the right and left rear wheels WRR, WRL is then reduced gradually in accordance with increase in vehicle speed. The driving torque of each of the right and left rear wheels WRR, WRL is limited to 800 Nm (upper limit) or less at high-speed driving, for example. On the other hand, in the technique of the present invention, the driving torque of each of the right and left rear wheels WRR, WRL is limited to 1,200 Nm (upper limit) or less, for example, and the driving torque transmitted to the hypoid gear portion 6 is limited to 1,600 Nm (upper limit) or less, for example.

The case of low-speed straight ahead driving as shown in FIG. 6A will first be described. Here, a total torque command value for the right and left rear wheels WRR, WRL is 1,600 Nm. In the conventional method, since a torque distribution ratio between the right and left rear wheels WRR, WRL is 1:1, driving torque of each of the right and left rear wheels WRR, WRL becomes 800 Nm. On the other hand, in the technique of the present invention, since the total driving torque is limit value (1,600 Nm) or less, the driving torque of each of the right and left rear wheels WRR, WRL becomes 800 Nm. Thus, at the low-speed straight ahead driving, there is no distraction between the driving torques of the right and left rear wheels WRR, WRL in both of the techniques. In this regard, FIG. 6A shows the case where the technique of the present invention is applied. The number of arrows shown at the side of each of the rear wheels represents the magnitude of the driving torque to be transmitted to each of the right and left rear wheels WRR, WRL. In the cases shown in FIG. 6B and FIG. 7 below, the number of arrows represents the magnitude of driving force of each of the right and left rear wheels WRR, WRL.

Next, the case of at high-speed turning driving as shown in FIG. 6B will be described. In this case, in the conventional method, the torque command value of each of the right and left rear wheels WRR, WRL becomes 800 Nm lower than that at low-speed driving as described above. For example, when the four-wheel drive vehicle 1 turns to the left at high-speed driving, the driving torque of the right rear wheel WRR becomes 800 Nm, and the driving torque of the left rear wheel WRL becomes 0 Nm. On the other hand, in the technique of the present invention, since it is controlled so that the driving torque of each of the right and left rear wheels WRR, WRL becomes 1,200 Nm or less, the driving torque of the right rear wheel WRR becomes 1,200 Nm and the driving torque of the left rear wheel WRL becomes 0 Nm when the four-wheel drive vehicle 1 turns to the left at high-speed driving, for example. Thus, at high-speed turning driving, the technique of the present invention can exert higher turning performance than that in the conventional method.

Finally, the case of right and left split μ road driving (the case where μ of contact areas of the right and left rear wheels WRR, WRL is different from each other) as shown in FIG. 7 will be described. In the conventional method, since the right rear wheel WRR contacting a road surface with low μ is spun, driving torque of each of the right and left rear wheels WRR, WRL becomes 1,200 Nm that is an upper limit (maximal driving torque). On the other hand, in the technique of the present invention, since the right rear wheel WRR is spun, a difference between wheel speeds of the right and left rear wheels WRR, WRL becomes the threshold value or more ("Yes" at Step S4). The 4WD-ECU 100 determines right and left split μ driving (Step S6), and thus, the total driving torque of the rear wheels WRR, WRL is not set to the limit value (the process at Step S8 is not carried out). For that reason, the driving torques of the right and left rear wheels WRR, WRL are increased to 1,200 Nm, which is the upper limit, while the difference between the wheel speeds of the right and left rear wheels WRR, WRL becomes less than the threshold value ("No" at Step S4) and it is determined to be normal control (Step S5). As a result, the driving torque of each of the right and left rear wheels WRR, WRL becomes 1,200 Nm. Here, the total of the torque command values of the right and left rear wheels WRR, WRL becomes 2,400 Nm, and exceeds a design limit value of 1,600 Nm for the hypoid gear portion 6. However, since the right rear wheel WRR is spun in this state, actual driving torque to be transmitted to the hypoid gear portion 6 does not exceed the limit value. Thus, by canceling the limit of the total driving torque of the rear wheels WRR, WRL at right and left split μ road running in the case of the technique according to the present invention, it is possible to exert the mobility performance similar to that in the conventional method.

As explained above, the driving force distribution device according to the present invention (the 4WD-ECU 100, the rear differential DR) is a driving force distribution device in the four-wheel drive vehicle 1 for variably distributing driving force between front and rear wheels and capable of distributing the driving force between the right and left wheels WRR, WRL of the rear wheels, which are one of the front and rear wheels. The driving force distribution device is constructed so as to include: the wheel speed sensors 13 for detecting rotational speeds (wheel speeds) of the respective right and left rear wheels WRR, WRL to which the driving force can be distributed; the 4WD-ECU 100 that sets up the limit value (for example, 1,200 Nm) for limiting the driving force transmitted to from the engine ENG to the right and left rear wheels WRR, WRL in the case where the difference between the rotational speeds of the right and left rear wheels WRR, WRL detected by the wheel speed sensors 13 is less than the predetermined value (threshold value); and the rear differential DR for distributing the transmitted driving force between the right and left rear wheels WRR, WRL. The driving force distribution device is also constructed that, in the case where the difference between the rotational speeds of the right and left rear wheels WRR, WRL detected by the wheel speed sensors 13 is less than the predetermined value, the rear differential DR distributes the transmitted driving force between the right and left rear wheels WRR, WRL so that the total value of the driving forces of the right and left rear wheels WRR, WRL does not exceed the limit value set up by the 4WD-ECU 100. The driving force distribution device is also constructed that, in the case where the difference between the rotational speeds of the right and left rear wheels WRR, WRL detected by the wheel speed sensors 13 is the predetermined value or more, the rear differential DR transmits the driving force up to the driving force upper limit (for example, 1,200 Nm) of each wheel to the respective right and left rear wheels WRR, WRL regardless of the total value of the driving force of the right and left rear wheels WRR, WRL. Here, it is preferable that the sum (2,400 Nm) of the driving force upper limits of the right and left rear wheels WRR, WRL is set to become larger than the limit value (1,600 Nm). Since the driving force distribution device according to the present invention is constructed in this manner, it is possible to make the hypoid gear portion 6 smaller and lighter while ensuring the degrees of freedom of yaw motion control of the four-wheel drive vehicle 1 even in a high vehicle speed region by controlling the total value of the driving torques of the right and left rear wheels WRR, WRL so as not to exceed the predetermined limit value without uniformly limiting the maximal transmitted torque of each of the multiplate clutches CL, CR depending upon the vehicle speed as well as the conventional method.

Further, in the driving force distribution device according to the present invention, in the case where it is determined that the four-wheel drive vehicle 1 drives on a right and left split μ road on the basis of the difference of the wheel speeds by comparing the wheel speeds of the right and left rear wheels WRR, WRL with each other, it is possible to ensure a mobility performance similar to that in the conventional method by canceling a limitation on the total value of the driving torques of the right and left rear wheels WRR, WRL.

As described above, although the embodiment of the driving force distribution device according to the present invention has been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure or function that is not described directly in the specification and the drawings falls within the technical idea of the present invention so long as the function and the effect of the present invention are achieved. Namely, each of the ECUs 10, 11, 100 constituting the driving force distribution device and each component constituting the rear differential DR can be replaced with any arbitrary component that can achieve the similar function to the corresponding component of the hydraulic control device for the automatic transmission. Further, arbitrary components may be added to the hydraulic control device for the automatic transmission. For example, although the wet type multiplate clutches CL, CR have been explained as one example of the clutches in the rear differential DR in the embodiment described above, the clutches in the rear differential DR are not limited thereto. The clutches in the rear differential DR may be hydraulic clutches or electromagnetic cam type clutches.

In this regard, although the driving condition of the four-wheel drive vehicle 1 has been determined on the basis of the difference between the wheel speeds of the right and left rear wheels WRR, WRL by detecting the wheel speeds using the wheel speed sensors 13 in the embodiment described above, in the driving force distribution device according to the present invention, the driving condition of the four-wheel drive vehicle 1 may be determined on the basis of a difference between accelerations of the right and left rear wheels WRR, WRL in place of the difference between the wheel speeds of the right and left rear wheels WRR, WRL.

Further, although the case of distributing the driving force between the right and left rear wheels WRR, WRL by means of the driving force distribution device has been described in the embodiment described above, the present invention is not limited to the driving force distribution device for distributing the driving force between the right and left rear wheels WRR, WRL. The driving force distribution device according to the present invention may be configured so as to distribute driving force between the right and left front wheels WFR, WFL.

What is claimed is:

1. A driving force distribution device for a four-wheel drive vehicle, the driving force distribution device variably distributing driving force between front and rear wheels, the driving force distribution device being capable of distributing the driving force between right and left wheels of one of the front and rear wheels to independently control an engagement force of each of right and left clutches corresponding to the right and left wheels, the driving force distribution device comprising:

wheel speed sensors each detecting rotational speed of each of the right and left wheels to which the driving force can be distributed;

a front and rear wheel power control section that sets up a limit value for limiting driving force transmitted from a driving source to the one of the front and rear wheels in the case where a difference between the rotational speeds of the right and left wheels detected by the wheel speed sensors is less than a predetermined value; and a right and left wheel power transmission control section for distributing the transmitted driving force between the right and left wheels of the one of the front and rear wheels, wherein, in the case where the difference between the rotational speeds of the right and left wheels detected by the wheel speed sensors is less than the predetermined value, the right and left wheel power transmission control section distributes the transmitted driving force between the right and left wheels so that a total value of the driving forces of the right and left wheels does not exceed the limit value set up by the front and rear wheels power transmission control section, and the right and left wheel power transmission control section controls the engagement force of each of the right and left clutches corresponding to the right and left wheels in accordance with the transmitted driving force distributed for each of the right and left clutches, and wherein, in the case where the difference between the rotational speeds of the right and left wheels detected by the wheel speed sensors is the predetermined value or more, the right and left wheel power transmission control section distributes the transmitted driving force between the right and left wheels so that the driving force up to a driving force upper limit, which is set up in advance, is transmitted for each wheel to the respective right and left rear wheels regardless of the total value of the driving forces of the right and left rear wheels, and the right and left wheel power transmission control section controls the engagement force of each of the right and left clutches corresponding to the right and left wheels in accordance with the transmitted driving force distributed for each of the right and left clutches, wherein the limit value is less than a sum of the driving force upper limits of the right and left rear wheels.

* * * * *